US008997051B2

(12) United States Patent
Robertson et al.

(10) Patent No.: US 8,997,051 B2
(45) Date of Patent: Mar. 31, 2015

(54) APPARATUS AND METHOD FOR DECOMMISSIONING/RECOMMISSIONING A COMPONENT/PROGRAM OF A COMPUTER SYSTEM

(71) Applicants: Stuart N. Robertson, Houston, TX (US); Clifton N. B. Triplett, Spring, TX (US)

(72) Inventors: Stuart N. Robertson, Houston, TX (US); Clifton N. B. Triplett, Spring, TX (US)

(73) Assignee: Baker Hughes Incorporated, Houston, TX (US)

( * ) Notice: Subject to any disclaimer, the term of this patent is extended or adjusted under 35 U.S.C. 154(b) by 173 days.

(21) Appl. No.: 13/708,397

(22) Filed: Dec. 7, 2012

(65) Prior Publication Data

US 2014/0165050 A1    Jun. 12, 2014

(51) Int. Cl.
*G06F 9/44* (2006.01)
*G06F 9/445* (2006.01)

(52) U.S. Cl.
CPC ........................ *G06F 8/62* (2013.01)
USPC ............................ 717/124; 717/120

(58) Field of Classification Search
CPC ............... G06F 8/62; G06F 8/70; G06F 8/77
USPC .................................. 717/120–135
See application file for complete search history.

(56) References Cited

U.S. PATENT DOCUMENTS

| | | | |
|---|---|---|---|
| 7,043,734 B2 * | 5/2006 | Limprecht et al. | 719/315 |
| 8,122,444 B2 * | 2/2012 | Grechanik et al. | 717/168 |
| 8,200,636 B2 * | 6/2012 | Hicks et al. | 707/661 |
| 8,639,561 B2 * | 1/2014 | Boudreau et al. | 705/7.35 |
| 2005/0044367 A1 * | 2/2005 | Gasparini et al. | 713/172 |
| 2005/0049973 A1 * | 3/2005 | Read et al. | 705/59 |
| 2005/0144590 A1 * | 6/2005 | Limprecht et al. | 717/120 |
| 2005/0149953 A1 * | 7/2005 | Limprecht et al. | 719/328 |
| 2006/0056336 A1 * | 3/2006 | Dacosta | 370/328 |
| 2006/0206528 A1 | 9/2006 | Hicks et al. | |
| 2008/0235665 A1 * | 9/2008 | Sridhar et al. | 717/120 |
| 2009/0037896 A1 | 2/2009 | Grechanik et al. | |
| 2012/0191803 A1 * | 7/2012 | Ray et al. | 709/217 |
| 2013/0054492 A1 * | 2/2013 | Boudreau et al. | 705/400 |
| 2013/0132933 A1 * | 5/2013 | Rajaram et al. | 717/126 |
| 2014/0025186 A1 * | 1/2014 | Ojha et al. | 700/83 |
| 2014/0067091 A1 * | 3/2014 | Vishwanath et al. | 700/83 |

OTHER PUBLICATIONS

Bowker, Mark; "Automating the Data Center with VMware Lifecycle Manager," ESG Enterprise Strategy Group, Virtualization and IT Infrastructure Brief, Apr. 2008, pp. 1-3.
Brereton, Pearl et al.; "The Future of Software: Defining the Research Agenda," Communications of ACM, vol. 42, No. 12, Dec. 1999, pp. 1-24.
Microsoft; "Hyper-V Cloud Fast Track Program," www.microsoft.comlprivatecloud, Feb. 2011, pp. 1-45.

* cited by examiner

*Primary Examiner* — Qing Chen
(74) *Attorney, Agent, or Firm* — Cantor Colburn LLP

(57) ABSTRACT

A program stored on a computer-readable medium for self-decommissioning at least a part of a program product is disclosed. The program may include a program code that defines a plurality of functions, a program code that includes a metric for each of the plurality of functions, wherein the metric includes at least a usage pattern and transactions relating to the metric, a program code configured to measure at least one metric, a program code defining a logic relating to the self-decommissioning of a component and/or program, a program code configured to determine decommissioning of the at least a part of the program product based on the logic, and a program code configured to self-decommission the at least a part of the program.

22 Claims, 2 Drawing Sheets

APPARATUS AND METHOD FOR DECOMMISSIONING/RECOMMISSIONING A COMPONENT/PROGRAM OF A COMPUTER SYSTEM

BACKGROUND OF THE DISCLOSURE

1. Field of the Disclosure

The present disclosure relates generally to management of components and programs of a computer system and an integrated process for decommissioning/re-commissioning of one or more components and programs of the computer systems.

2. Description of the Related Art

Large scale computer systems are commonly utilized for database management and enterprise-wide information exchange. Such systems may utilize a number of servers (processors) at different locations, a variety of data bases and application programs accessible to users at multiple locations via an enterprise network of hardware components, program codes and the Internet. Often such systems include a large number applications programs, such as data processing systems, billing systems, accounts receivable system, data processing systems, personnel systems, project management systems, asset management system, inventory systems, etc. Some such systems may further include subsystems. Some such systems are deployed initially and others are deployed over time as needed. Similarly, components, such a servers, interconnectivity components, user-operated devices and the like are installed on an ongoing basis. Typically, the emphasis of the information technology organizations of the enterprise (internal and/or external to enterprises) managing such computer systems is on the deployment of applications and new resources versus the retirement and decommissioning of the unutilized and/or underutilized components, applications and stored data. Such systems over time become less efficient, require larger hardware capacity and become expensive to maintain.

The disclosure herein provides apparatus and methods for self-decommissioning and self-re-commissioning of selected components and programs of a computer system.

SUMMARY

In one aspect, a decommissioning program stored on a computer-readable medium for self-decommissioning a component and/or program of a computer system is disclosed. In one embodiment a decommissioning program may include a program code that defines at least one function, a program code that includes a metric for the at least one function, a program code configured to measure the metric, a program code defining a logic relating to the self-decommissioning of a component and/or program, and program code that self-decommissions a component and/or a program when the measurements meet a logic criterion.

In another aspect, a system for decommissioning a component and/or a program of a computer system is disclosed that in one embodiment may include a plurality of components including a processor and a memory device, a plurality of application programs accessible to the processor, and a self-decommissioning program that in one embodiment may include: a program code that defines a plurality of functions relating to the computer system, a program code that includes at least one metric for each of the plurality of functions, a program code for measuring the at least one metric, a program code that defines a logic for self-decommissioning of a selected component or a program of the computer system, a program code that determines when the measurements meet a logic criterion, and a program code that self-decommissions the selected component and/or program when the measurements meet the logic criterion.

Examples of certain features of the apparatus and method disclosed herein are summarized rather broadly in order that the detailed description thereof that follows may be better understood. There are, of course, additional features of the apparatus and method disclosed hereinafter that will form the subject of the claims.

BRIEF DESCRIPTION OF THE DRAWINGS

For detailed understanding of the present disclosure, references should be made to the following detailed description taken in conjunction with the accompanying drawings in which like elements have generally been given like numerals and wherein.

DESCRIPTION OF THE DISCLOSURE

Figure 1:
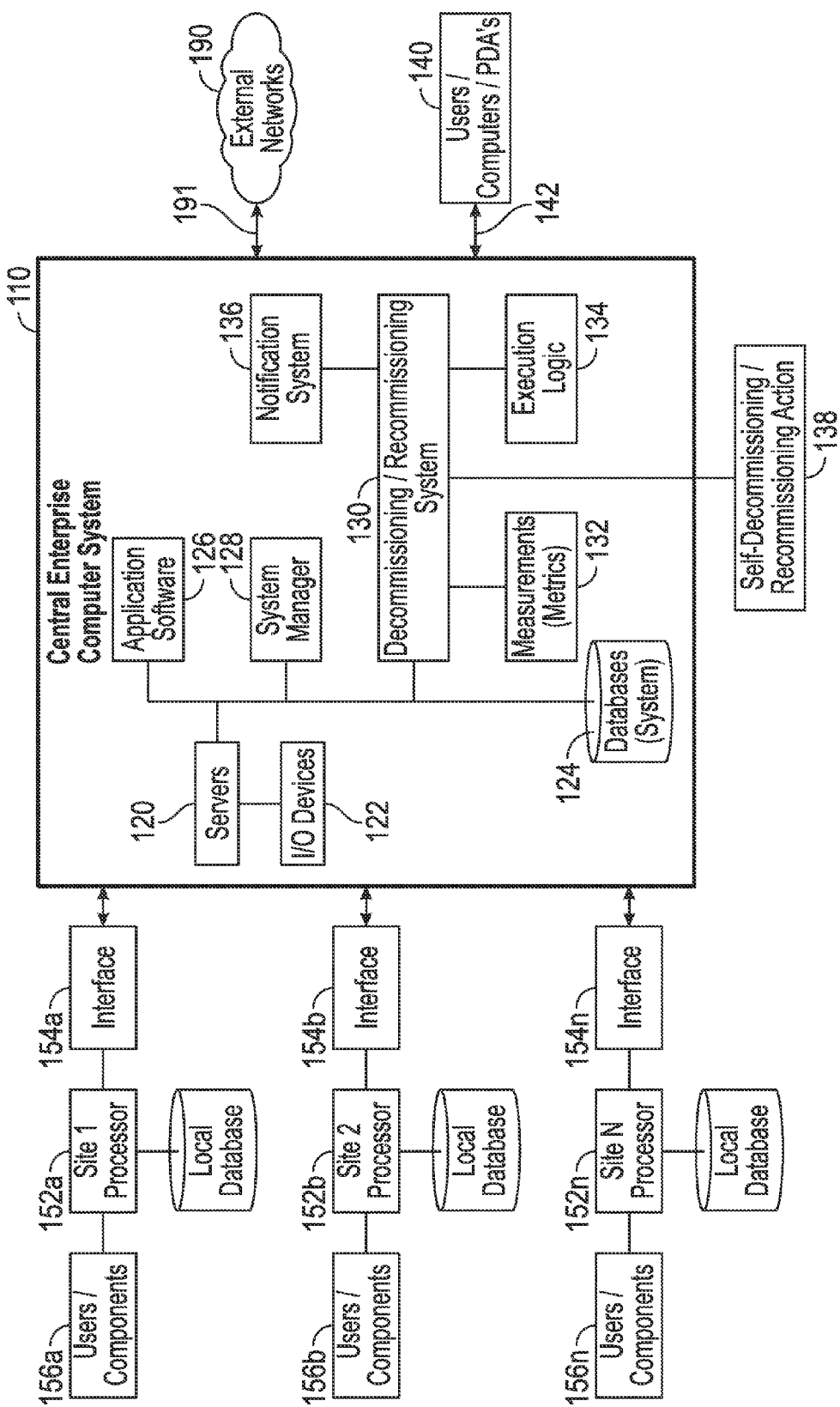
FIG. 1 depicts an enterprise computer system network that includes one or more decommissioning/re-commissioning programs, according to one embodiment of the disclosure.

FIG. 1 depicts an enterprise computer system network 100 that includes one or more systems for decommissioning/re-commissioning one or more components/programs of the computer system network 100, according to one embodiment of the disclosure. The network system 100 includes a central enterprise computer system 110 that includes one or more servers 120 (also referred to as processors) for handling large scale data processing and information communications of the enterprise. The servers 120 are coupled to input/output (I/O) devices 122 and a database system 124. The I/O devices may include interfaces, monitors, memory banks, etc. The database system 124 may include a variety of data bases relating to the enterprise business, including, but not limited to, payroll data, safety information data, human resources data, accounts receivable and payable data, project management data, and purchasing data. The database may be divided into sub-databases by category or another suitable manner. The central computer system 110 also includes a number of applications programs 126. The applications program may include, but, are not limited to, payroll programs, safety information programs, human resources programs, accounts receivable programs, accounts payable programs, project management programs and purchasing programs. The term program, in general, refers to a computer programs and the term program code refers to a computer code or routine relating to a program or a subprogram. The computer system 110 is shown to include a program manager 128 that may be used, for example, by information technology personnel to interact with the enterprise computer system network 100.

The central computer system 110 may communicate with the external networks 190, including, but not limited to, the Internet via network connections 191. The central computer system 110 may communicate with local users 140 at the central computer site via interface 142. The central computer system 110 may also communicate with servers or processors at one or more sites. FIG. 1 shows local computer systems 152a, 152b through 152n respectively at sites S1, S2, through Sn communicating with the central computer system 110 respectively via interfaces 154a, 154b through 154n. Users, such as 156a, 156b through 156n respectively at sites S1, S2 through Sn may utilize the local computer systems 152a, 152b through 152n to use local application programs, communicate with the central computer system 110 and application programs 126 and the Internet 190. The users may utilize individual components, such a desk top computers, portable computers, personal digital assistants (PDA's) and other suitable devices to perform user tasks. In a computer, system such as shown in FIG. 1, numerous other devices, such as interface hardware, cabling, monitors and the like are used for communicating information. In general, the term "component" is used herein to include a hardware component, such as a server, personal computer, monitor, processor, cabling, PDA, etc.

In a computer network system network, such as the exemplary system 100, a number of programs are installed over time to enable the enterprise personnel to exchange information and perform tasks. Often, such systems start with certain components and programs. Additional components and programs are typically installed continually as the need arises. Information technology organizations managing the computer network systems tend to place more emphasis on the development and deployment of applications and new components compared to decommissioning and retirement of components and programs. Some decommissioning approaches wait for specific authorization or input before decommissioning programs and are thus not self-decommissioning. Also, decommissioned components and programs are not generally self-re-commissioned. The disclosure herein provides a decommissioning system that may be built into the computer network at the deployment of a certain components and programs. Such systems may be self-decommissioning and/or self-re-commissioning and may be self-adjusting based on defined criteria. Application programs may be designed to include a decommissioning/re-commissioning program code or routine at the development stage and may thus be integrated into the program and the system. One or more decommissioning/re-commissioning programs or subprograms may be located at the central computer network system 110 and/or at the local sites S₁, S₂ through Sn.

In aspects, the computer system may include a decommissioning and/or a decommissioning and re-commissioning system 130. The system 130 may include one or programs or program products, which program may be a stand-alone program accessible to the server 120 or may reside in or embedded in one or more other programs in the computer system network 100. In other aspects, the program 130 may be developed as part of other programs that may be subject to decommissioning. The program 130 may include a program routine or code 132 that measures one or more metrics defined for the programs subject to decommissioning and may also include a program code 134 that defines or a logic that defines when the measurements relating to a metric meet decommissioning criterion or criteria. A notification program 136 may be included in the system 130 that notifies selected personnel in the enterprise before decommissioning a program. The system 130 may also include a program code for self-decommissioning of a program 138 when the measurements meet a set criterion. Additionally, the system 130 may include a program code for re-commissioning a decommissioned program, based on the continued measurements of a metric. The system 130 is equally applicable to decommissioning and re-commissioning of a component of a computer system. An exemplary method for decommissioning and re-commissioning employed by the system 130 is described in more detail in reference to FIG. 2.

Figure 2:
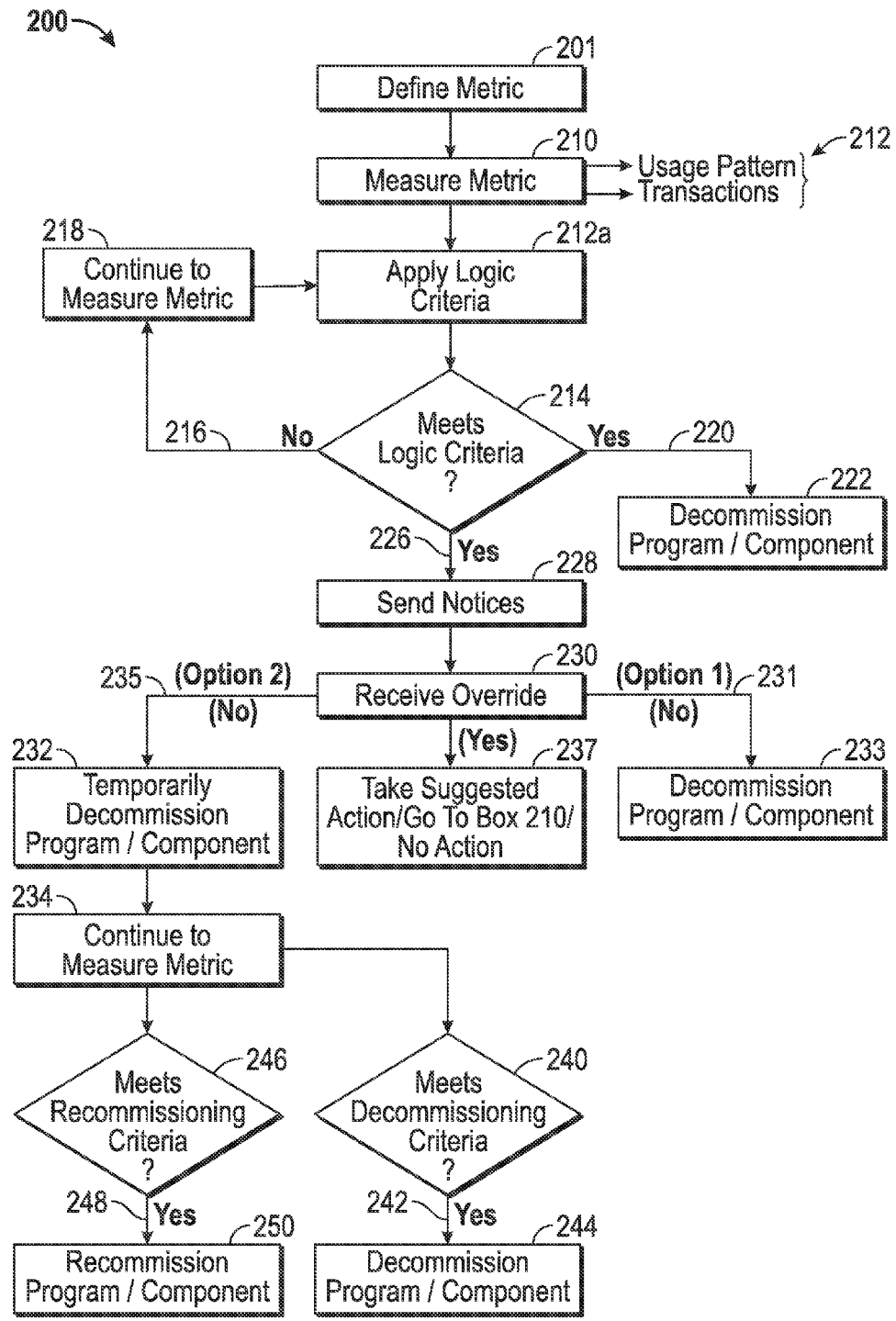
FIG. 2 is a flow diagram of a process or method for decommissioning/re-commissioning a component and/or program of the computer system, according to one embodiment of the disclosure.

FIG. 2 is a flow diagram showing a decommissioning/re-commissioning method or process 200, according to one embodiment of the disclosure. In the method 200 a metric of a function or application is defined (Box 201) and the measurements of the metric are made (Box 210). In an aspect, such measurements may be made over a selected time period. The metric may include any suitable aspect relating to a component and/or a program, such as, number of users, usage (volume, pattern, timing, etc.), transactions, various statistics and any other suitable parameter. Other aspects may include the age of a component, operating life of a component, availability of upgrades or new versions, etc. The logic in the decommissioning program is applied to the measurements made (Box 212a) to determine whether the measurements of the metric made meet the logic (criterion/criteria) set for that metric (Box 214). If the criterion/criteria are not met (Path 216), the system 200 may continue to measure the metric for an additional time period (Box 218) and repeat the steps 212a and 214. If the measurements meet the criterion/criteria, the method 200 may choose an option relating to further action. In one option (Path 220), the method 200 may automatically self-decommission a selected component and/or a program or a part of a program (Box 222) as defined or set forth in the decommissioning program. In another option (Path 226), the method 200 may send notifications (Box 228) to selected personnel. Such notifications may include an initial notification, such as a warning that a measurement has met a criterion/criteria and may provide a warning that the system will automatically decommission a selected component and/or a program after a certain time period if the future measurements continue to meet the threshold over a time period. Alternatively, the method 200 may allow certain personnel to override the anticipated decommissioning of a program/component (Box 230). If an override is received, the method takes an action as provided in the override and if no action is provided, it may revert to (Box 210) after a certain period of time or take no action with respect to the particular component and/or program (Box 237). If no override is received, the method automatically may choose a decommissioning option. In one option (Option 1, path 231), the system may permanently decommission a component and/or a program (Box 233). Alternatively, the method may opt for another option (Option 2, path 235) to temporarily decommission a component and/or program (Box 232) and the method then may continue to make the measurements of the metric (Box 234). The logic is then applied to the continued measurement (Box 240) and if the continued measurements meet the logic or criteria for permanently decommissioning a component and/or program (Path 242), the method permanently decommissions the selected component/and or program (Box 244). If not, the measurements are checked against the logic for re-commissioning the component/and or program (Box 246) and if the logic criterion/criteria are met (Path 248), the component and/or program is re-commissioned (Box 250). FIG. 2 shows only an exemplary method, various other decision paths may be taken for decommissioning and/or re-commissioning components/programs. For example, the temporary decommissioning and re-commissioning may automatically be performed based on set criterion/criteria without requesting or waiting for permission. In another aspect, the entire system may be configured to automatically self-decommission and/or re-commission components and programs of the computer system.

Referring to FIGS. 1 and 2, the decommissioning/re-commissioning program may reside or be integrated into any program, be a separate module associated with one or more programs, reside at a server at the central computer system or at a site computer system or any combination thereof. In one aspect, the decommissioning and/or re-commissioning programs are program codes that are part of other programs and are developed or added into other programs. Therefore, in one embodiment, such programs are integrated into or are integral to other programs and thus can operate efficiently within the program(s) in which they are embedded.

While the foregoing disclosure is directed to the preferred embodiments of the disclosure, various modifications will be apparent to those skilled in the art. It is intended that all variations within the scope and spirit of the appended claims be embraced by the foregoing disclosure.

The invention claimed is:

1. A program product stored on a non-transitory computer-readable medium for self-decommissioning and self-recommissioning a program of a computer system, the program product comprising:
   a program code that defines a function;
   a program code that defines a metric for the function;
   a program code that measures the metric for the function;
   a program code that defines a logic relating to decommissioning of the program of the computer system based on the measured metric for the function;
   a program code that determines decommissioning of the program of the computer system based on the logic relating to the decommissioning of the program of the computer system;
   a program code that self-decommissions the program of the computer system based on the determined decommissioning of the program of the computer system; and
   a program code that self-recommissions at least a portion of the decommissioned program of the computer system when the measured metric for the function meets a logic relating to recommissioning of the decommissioned program of the computer system.

2. The program product of claim 1, wherein the program product includes one of: an operating system and a plurality of user accessible application programs configured to interact with one of: an intra-company computer network system and the Internet.

3. The program product of claim 1, wherein the program code that measures the metric for the function and the program code that self-decommissions the program of the computer system are integral to the program product.

4. The program product of claim 1, wherein the program code for that self-decommissions the program of the computer system includes self-decommissioning of the entire program product.

5. The program product of claim 1, wherein the program code that measures the metric for the function to includes dynamically measuring the metric for the function.

6. The program product of claim 1, further comprising a program code that sends a message relating to the self-decommissioning of the program of the computer system before self-decommissioning the program of the computer system.

7. The program product of claim 1, wherein the program code that defines the logic relating to the decommissioning of the program of the computer system includes defining an event selected from a group consisting of: a timing of the decommissioning of the program of the computer system; a sequence of the decommissioning of the program of the computer system; a notification process before the decommissioning of the program of the computer system; a notification process after the decommissioning of the program of the computer system; and scaling the decommissioning of the program of the computer system.

8. The program product of claim 1, further comprising a program code that overrides the self-decommissioning of the program of the computer system based on a selected user input.

9. The program product of claim 1, wherein the metric for the function includes usage pattern and transactions.

10. A system, comprising:
    a plurality of components including at least one server having a processor and a memory device; and
    a program product accessible to the processor for executing instructions contained in the program product, wherein the program product includes:
      a plurality of application program codes including program codes accessible to users for performing tasks; and
      a self-decommissioning program product including:
        a program code that defines a plurality of functions relating to the system,
        a program code that includes at least one metric for each of the plurality of functions,
        a program code that measures the at least one metric for each of the plurality of functions,
        a program code that defines a logic for decommissioning at least a part of a component of the system based on the measured at least one metric for each of the plurality of functions,
        a program code that determines decommissioning of the at least a part of the component of the system based on the logic for decommissioning the at least a part of the component of the system,
        a program code that self-decommissions the at least a part of the component of the system based on the determined decommissioning of the at least a part of the component of the system, and
        a program code that self-recommissions the at least a part of the decommissioned component of the system when the measured at least one metric for each of the plurality of functions meets a logic for recommissioning the at least a part of the decommissioned component of the system.

11. The system of claim 10, wherein the at least one metric for each of the plurality of functions includes a usage pattern and transactions relating to the at least one metric for each of the plurality of functions.

12. The system of claim 10, wherein at least a portion of the self-decommissioning program product is integral to the program product.

13. The system of claim 10, wherein the program code that self-decommissions the at least a part of the component of the system includes self-decommissioning of the entire program product.

14. The system of claim 10, wherein the program code that measures the at least one metric for each of the plurality of functions includes dynamically measuring the at least one metric for each of the plurality of functions.

15. The system of claim 10, further comprising a program code that sends a message relating to the self-decommissioning of the at least a part of the component of the system before self-decommissioning the at least a part of the component of the system.

16. The system of claim 10, wherein the component of the system is selected from a group consisting of: a hardware component; a program code; and a combination of a hardware component and a program code.

17. The system of claim 10, wherein the program code that defines the logic for decommissioning the at least a part of the component of the system includes defining an event selected from a group consisting of: a timing of the decommissioning of the at least a part of the component of the system; a sequence of the decommissioning of the at least a part of the component of the system; a notification process before the decommissioning of the at least a part of the component of the system; a notification process after the decommissioning of the at least a part of the component of the system; and scaling the decommissioning of the at least a part of the component of the system.

18. The system of claim 10, further comprising a program code that overrides the self-decommissioning of the at least a part of the component of the system based on a selected user input.

19. The system of claim 10, wherein the plurality of components are interconnected via one of: an intra-company computer network system; the Internet; and a combination of the intra-company computer network system and the Internet.

20. A computer system, comprising:
a network including a server having a processor and a memory device;
a component in communication within the network; and
a program product including a plurality of program codes accessible to the server for executing instructions contained in the plurality of program codes, wherein at least one of the plurality of program codes is configured to define a function, wherein another of the plurality of program codes is configured to define a metric for the function, wherein another of the plurality of program codes is configured to measure the metric for the function, wherein another of the plurality of program codes is configured to define a logic relating to decommissioning of the component of the computer system based on the measured metric for the function, wherein another of the plurality of program codes is configured to determine decommissioning of the component of the computer system based on the logic relating to the decommissioning of the component of the computer system, wherein another of the plurality of program codes is a decommissioning program code configured to self-decommission the component of the computer system based on the determined decommissioning of the component of the computer system, and wherein another of the plurality of program codes is a recommissioning program code configured to self-recommission at least a part of the decommissioned component of the computer system when the measured metric for the function meets a logic relating to recommissioning of the decommissioned component of the computer system.

21. The computer system of claim 20, wherein the decommissioning program code is integral to at least one of the plurality of program codes.

22. The computer system of claim 20, wherein the decommissioning program code selects at least one of a timing and a sequence of the decommissioning of the component of the computer system based on a predetermined criterion.

* * * * *